United States Patent
Vasquez

(10) Patent No.: US 6,912,350 B1
(45) Date of Patent: Jun. 28, 2005

(54) DVD SUBPICTURE RENDERING WITHOUT LOSS OF COLOR RESOLUTION

(75) Inventor: Maximino Vasquez, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/458,109

(22) Filed: Dec. 8, 1999

(51) Int. Cl.[7] .................................................. H04N 5/91
(52) U.S. Cl. ........................ 386/95; 386/125; 386/126
(58) Field of Search ............................ 386/95, 68, 33, 386/81–82, 111–112, 126; 348/445, 578, 723; 345/610

(56) References Cited

U.S. PATENT DOCUMENTS

| | | | | |
|---|---|---|---|---|
| 5,227,863 A | * | 7/1993 | Bilbrey et al. .............. | 348/578 |
| 5,701,138 A | | 12/1997 | Othmer et al. | |
| 5,912,710 A | * | 6/1999 | Fujimoto .................... | 348/445 |
| 5,999,698 A | * | 12/1999 | Nakai et al. ................ | 386/126 |
| 6,088,507 A | * | 7/2000 | Yamauchi et al. ............ | 386/95 |
| 6,208,350 B1 | | 3/2001 | Herrera | |
| 6,466,226 B1 | * | 10/2002 | Watson et al. .............. | 345/610 |
| 6,549,722 B2 | * | 4/2003 | Okada et al. ............... | 386/126 |

* cited by examiner

Primary Examiner—Thai Tran
Assistant Examiner—Christopher Onuaku
(74) Attorney, Agent, or Firm—Thelen Reid & Priest, LLP; Marc Hanish

(57) ABSTRACT

A method an apparatus for rendering DVD subpicture data on a computer system having graphics data without a loss of subpicture resolution includes inserting a key into the subpicture data during or right after decoding and storing the subpicture data in the primary graphics surface. This key indicates whether the data is graphics (GUI) information or subpicture information. The key is then examined by hardware logic in the graphics chip, allowing other hardware logic to blend DVD subpicture data with DVD video data without losing subpicture color resolution. The key may be implemented differently for different color modes of the primary surface, and may be unnecessary in certain modes.

37 Claims, 6 Drawing Sheets

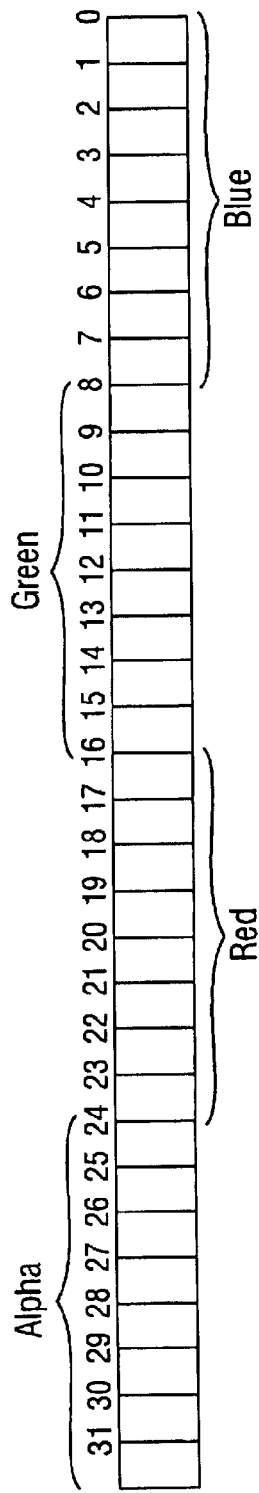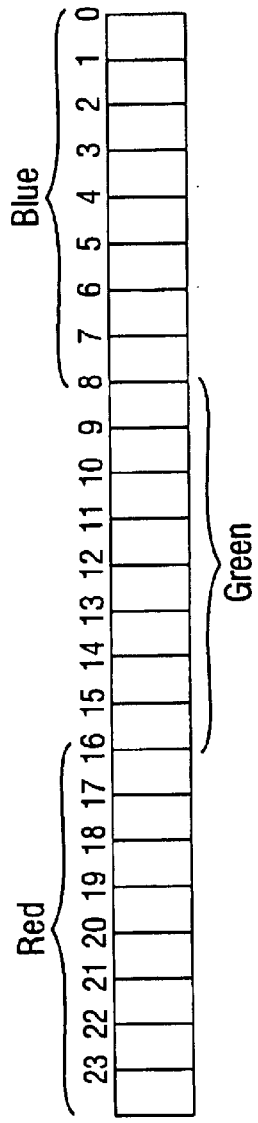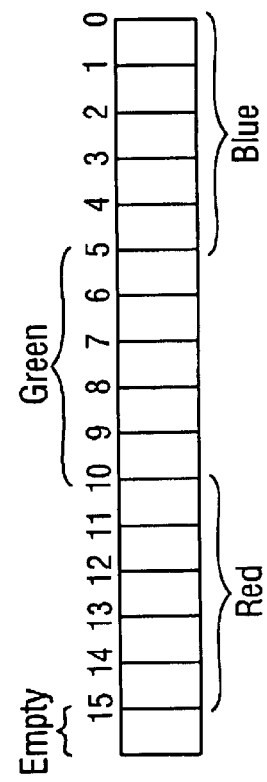
FIG. 5
FIG. 6
FIG. 8

DVD SUBPICTURE RENDERING WITHOUT LOSS OF COLOR RESOLUTION

BACKGROUND OF THE INVENTION

1. Field of the Invention

The present invention relates to the field of DVD (Digital Versatile Disk) technology. There are several types of DVD. This invention relates to DVD-video. More specifically, the present invention relates to the rendering of a DVD-video subpicture on a computer system without loss of color resolution.

2. The Background

DVD technology has grown in popularity in recent years. Many households now own a DVD player next to their television sets. Even more dramatically, however, nearly every computer sold now has a DVD-ROM player built into it. There are several problems that are encountered when attempting to play DVDs on a computer that are not encountered when attempting to play them on a traditional DVD player.

When playing a DVD-video on a computer, it is necessary to convert the picture to one that not only can be displayed on a computer monitor, but also may be integrated in to the existing operating system being run. An operating system usually has a user interface containing one or more windows which may run different programs. When a DVD is to be played on a computer, normally a new window must be open. However, other windows on the desktop may also be left open. Therefore, the video displayed in the DVD window must be of the same format (colors, resolution, etc.) as the rest of the desktop and the other windows in order to be properly displayed on the computer screen.

Another problem with displaying DVD video on a computer via hardware or software comes in how the video is decoded. DVD video is actually made up of two distinct pieces of video: the video and the subpicture. The video holds the data which is normally a movie or show, such as a direct translation of a film. The subpicture may hold other pieces of information specially designed for the DVD. This commonly includes things such as menus, closed captioning text, subtitles, etc. The video is encoded according to the MPEG-2 standard. The subpicture is encoded using run length encoding. The subpicture is a rectangle which can be any size up to the size of the video, and is blended with the video at a specified location.

Generally, a pixel of video information may be represented by RGB values (a value for each of the three primary colors- red, green, and blue) or by YUV values. A luminance value, denoted as Y, represents the brightness, or intensity, of a pixel. U and V are chrominance values, which together represent the color of a pixel in terms of hue and saturation. U and V are sometimes represented as $C_r$ and $C_b$. $C_b$ (representing blue information) is equal to B-Y and $C_r$ (representing red information) is equal to R-Y. The green value is not used in a separate color component since it can be derived by subtracting the two difference signals from the Y signal. The $YC_bC_r$ format is one type of YUV format, which generally refers to a form of color-difference video signal containing one luma and two chroma components.

The DVD video is encoded as MPEG-2, which uses a 4:2:0 $YC_bC_r$ component digital video format, indicating that there is one $C_b$ sample and one $C_r$ sample for every four Y samples. This also indicates that there is 2:1 horizontal downsampling and 2:1 vertical downsampling for the chrominance samples in relation to the luminance samples.

The subpicture video stream, however, uses a format equivalent to a 4:4:4 $YC_bC_r$ digital video format, indicating that $C_b$, $C_r$, and Y are sampled equally and there is no downsampling of the chrominance samples. This results in more color resolution being available for the subpicture than the video stream. The subpicture stream also contains information on how to blend each subpicture pixel with the corresponding video pixel. The value which controls this blending is called the alpha value.

When the DVD is played, the video data is blended with the subpicture data to produce a single image on the screen. In the past, DVD decoders generally decoded the MPEG-2 video data into a video surface as a 4:2:0 $YC_bC_r$ format picture. Then, the subpicture was also decoded and converted to 4:2:0 $YC_bC_r$, then blended with the video by the DVD decoder, resulting in a loss of color resolution. Decoding the subpicture data, converting it to the primary surface color RGB format, then writing it directly into the primary surface is generally not done because most primary surface color modes do not support an alpha value. Any RGB mode without an alpha value (24 bit or less primary surface) would require a fixed alpha to be used, thus dithering the data, which significantly reduces the quality of the subpicture data. This is due to the fact that the display pipeline (in the graphics chip) only knows how to read the video data in a single way for a particular primary surface color format. For example, if the primary surface is currently set to 24-bit RGB mode, the display pipe will be expecting data to be in an 8-8-8 format (8 bits for each of the red, green, and blue primary colors). It does not know how to handle any other format, and this format does not include an alpha component. Thus, the display pipe requires that the subpicture data be transformed into a format it can handle, resulting in the possible loss of subpicture resolution and a loss of the alpha values.

What is needed is a solution which allows for the blending of DVD subpicture data with DVD video data and graphics information without losing subpicture color resolution.

SUMMARY OF THE INVENTION

A method an apparatus for rendering DVD subpicture data on a computer system having graphics data without a loss of subpicture resolution includes inserting a key into the subpicture data during or right after decoding and storing the subpicture data in the primary graphics surface. This key indicates whether the data is graphics (GUI) information or subpicture information. The key is then examined by hardware logic in the graphics chip, allowing other hardware logic to blend DVD subpicture data with DVD video data without losing subpicture color resolution. The key may be implemented differently for different color modes of the primary surface, and may be unnecessary in certain modes.

BRIEF DESCRIPTION OF THE DRAWINGS

FIG. 5 is a diagram illustrating a 32-bit chunk of data in 32-bit ARGB mode.

FIG. 6 is a diagram illustrating a 24-bit chunk of data in 24-bit RGB mode.

FIG. 8 is a diagram illustrating a 16-bit chunk of data in 16-bit 555 RGB mode.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

Figure 1:
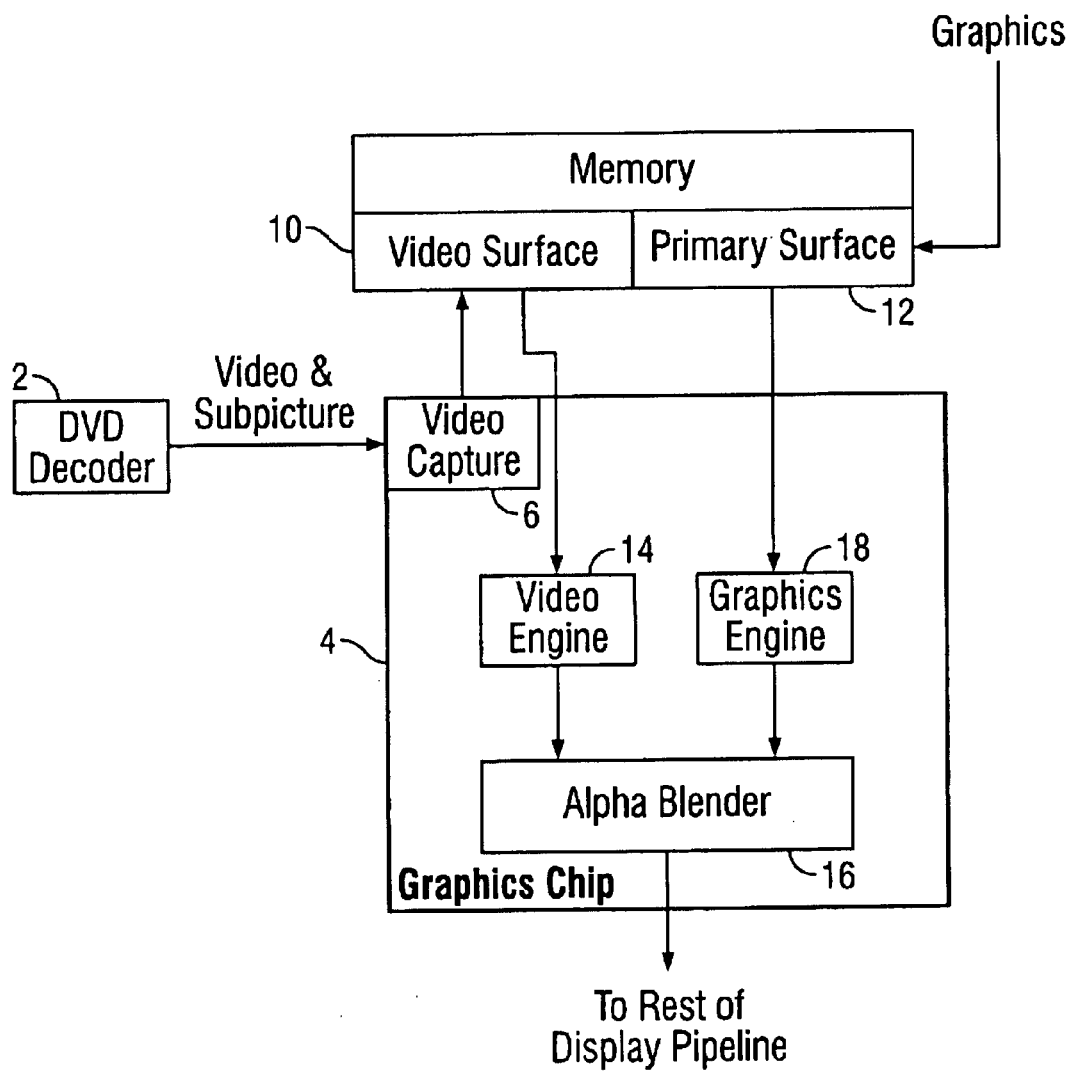
FIG. 1 is a block diagram illustrating the components traditionally used to blend video, subpicture, and graphics information on a computer monitor.

FIG. 1 is a block diagram illustrating the components traditionally used to blend video, subpicture, and graphics information on a computer monitor. DVD decoder 2, decodes the DVD information into video and subpicture information and blends them together. A graphics chip 4 receives the blended video and subpicture information in a video capture module 6. This blended video and subpicture information is then stored in memory 8, which contains a portion set aside solely for storing video data, also known as the video surface 10. The video surface 10 now contains video blended with subpicture.

Graphics to be displayed on the computer screen are stored in a primary surface 12 in memory 8. When it is necessary to display the graphics, video, and subpicture information on the computer monitor, a video engine 14 accesses the video surface 10 and then sends the blended video and subpicture information to an alpha blender 16. A graphics engine 18 does likewise with the graphics information. The alpha blender 16 then combines the blended video and subpicture, with the graphics information on the computer screen.

Pure software decoders work similarly, but write video and subpicture information directly into the video surface, bypassing the graphics chip 4 and capture module 6.

Figure 2:
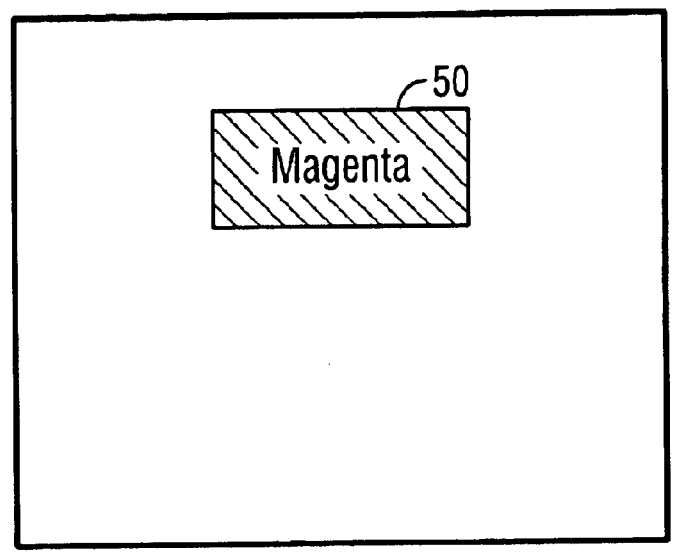
FIG. 2 is a diagram illustrating how a color key may be used to combine graphics with video and subpicture.

The primary surface may have many different formats. For 32-bit formats, ARGB is normally utilized which provides 8 bits for an alpha value, which represents the degree of transparency to be applied to a graphics pixel when combined with video or subpicture data. The alpha blender then uses this alpha field when blending the graphics with video or subpicture information. For formats less than 32-bit, a color key must be used. FIG. 2 is a diagram illustrating how a color key may be used to combine graphics with video and subpicture. One color, for example magenta, is set aside to indicate a location that is to contain video and/or subpicture information rather than graphics information. Any location on the screen, such as box 50, which contains that precise magenta color, will then display video or subpicture information. The alpha blender performs this task of combining the video or subpicture information into the correct portions of graphics information.

Figure 3:
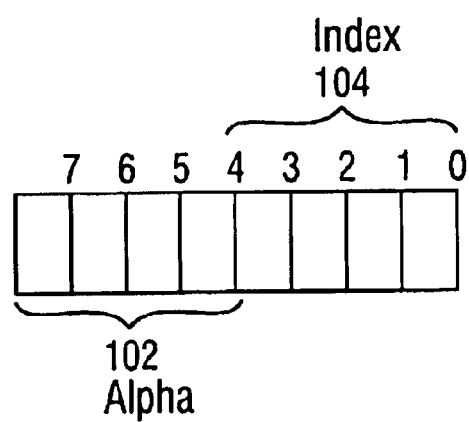
FIG. 3 is a block diagram illustrating this format of DVD subpicture data for a single pixel.

DVD subpicture data can be stored without information loss such that 8 bits of information are stored per pixel location. FIG. 3 is a diagram illustrating this format of DVD subpicture data for a single pixel. Four bits 102 contain the alpha, information on how to blend the color from the table with the video data, while four bits 104 contain an index to a color table indicating the color of the pixel. The alpha indicates the contrast or transparency level, with 0 being the subpicture is invisible and 15 being the subpicture is opaque.

The present invention provides a method and apparatus for blending subpicture data with video data using the primary surface in such a way that the subpicture color resolution and alpha values are not lost. How this works depends upon the current color mode of the primary surface. The invention will be described with relation to a primary surface of 32, 24, or 16-bit color resolution. However, one of ordinary skill in the art will recognize that other implementations are possible with other primary surface color resolution settings. Additionally, the preferred embodiment of the present invention is a combined software and hardware solution, however one of ordinary skill in the art will recognize that hardware only or software only embodiments of the present invention are also possible.

Figure 4:
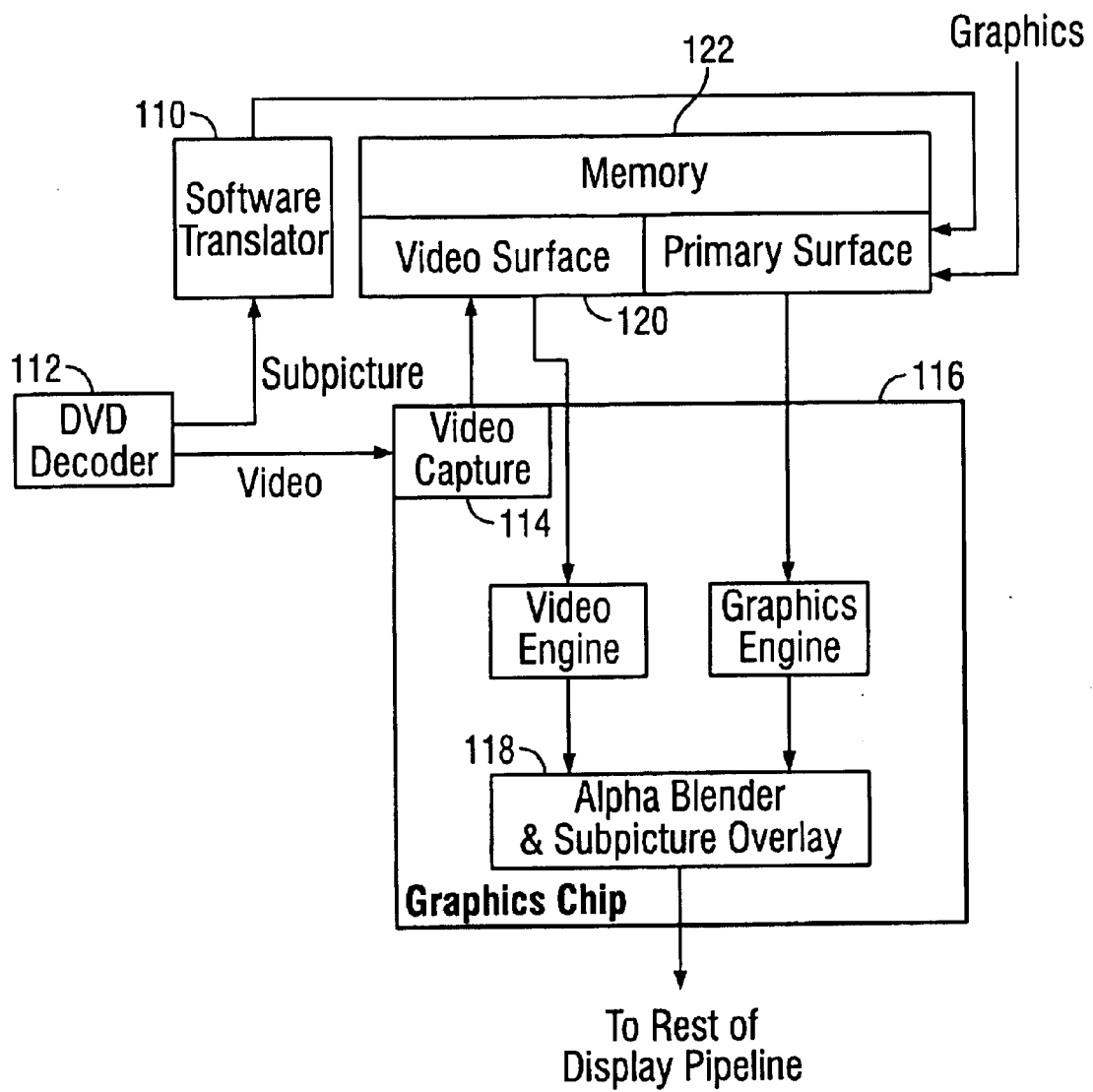
FIG. 4 is a block diagram illustrating the organization of a presently preferred embodiment of the present invention.

FIG. 4 is a block diagram illustrating the organization of a presently preferred embodiment of the present invention. A software translator 110 receives subpicture information from a software DVD decoder 112, while video information is sent to video surface 120 in memory 122. DVD decoder 112 would likely have been designed to combine separate video and subpicture streams since DVDs are encoded with separate streams, so separating out or requesting that the separate streams not be combined in the first place should not present a problem. To the extent that it does, however, an additional module may have to be placed after the DVD decoder 112 to separate out the subpicture and video streams. The present invention also assumes that the subpicture information received by the software translator 110 is in the standard 4:4 format. To the extent that it is not, it must be translated into that format.

The graphics chip 116 is also modified to include an alpha blender and subpicture overlay block 118 rather than simply an alpha blender. This is because the key potentially encoded into the stream by the software translator 110 needs to be encoded in some fashion. With a software DVD decoder 112, video capture module 114 may not have to be used. The details of this operation will be described later in this document.

It should be noted that the use of a software translator and hardware alpha blender and subpicture overlay block is only one possible embodiment of the present invention. One of ordinary skill in the art would recognize that such functions could be performed by hardware or software, and alternative placement of the blocks is possible.

The software translator and hardware logic (or other device in the display pipeline) are designed to utilize a key. The key is one or more bits that are transmitted with the RGB data and signifies whether the data is graphics or is subpicture information. In some cases the key is unnecessary, but in the most common formats (16 and 24 bit RGB) it is. The challenge in utilizing the key is that the hardware driver is still set up only to receive data that has a specific size. For example, in 24-bit RGB, the video driver is still designed only to receive data in 24-bit chunks. Thus any key must be designed to work within that limitation.

For a 32-bit primary surface, a key is probably unnecessary. FIG. 5 is a diagram illustrating a 32-bit chunk of data in 32-bit ARGB mode. As FIG. 5 shows, 32-bit ARGB mode provides for an 8-bit alpha field. For the subpicture, the software translator may simply write the contrast/transparency level into this 8-bit alpha field and the full resolution color information into the 24-bit RGB field. This allows for the direct writing of the subpicture information into the primary surface, preserving subpicture resolution. At that point, the subpicture may be treated as part of the normal graphics, and thus alpha blending of the video data and graphics data may be performed normally.

For a 24-bit primary surface, a 16-bit key is provided. FIG. 6 is a diagram illustrating a 24-bit chunk of data in 24-bit RGB mode. As FIG. 6 shows, in 24-bit RGB mode, video data has an 8-8-8 format (8 bits each for the red, green, and blue primary colors). The subpicture data is in the standard 4-4 format (4 bits for the alpha and 4 bits for the index). Thus the remaining 16 bits in the stream are open when subpicture data is stored in the primary surface. These 16 bits are used for the key.

The rationale behind using as many bits as possible for the key is that by reserving the bit combinations to indicate whether the stream is graphics or subpicture data, there will be a loss in the number of possible colors available for graphics data. This is due to the fact that the 8-8-8 RGB format does not provide any space for a key, and therefore bit combinations usually used for certain colors will have to be reserved for the key. If the number of possible colors is going to decrease, it is beneficial to have it decrease as little as possible. One 16-bit combination must be set aside to indicate that the data is subpicture information. This results in 256 possible colors being lost for the video data. Which 256 colors are lost are determined by which 16-bit combination is chosen for the key. For example, if the first 16-bits are chosen to represent the key and the bit combination representing subpicture is [00000000 00000001], this precludes every possible value for the "blue" primary color (the last 8 bits) when combined with this bit combination. Thus, the 24-bit value [00000000 00000001 ********] is precluded from use in the video data, where * denotes either a 0 or a 1. The value chosen for the key is usually a value that is not used very often and is dark.

While this choice of bit combinations will work, any combination of bits can be chosen for the key. The specific bits which represent the key may be altered so as to achieve a more even distribution. For example, bits 0, 2, 4, 5, 6, 8, 10, 11, 12, 14, 15, 17, 19, 20, 21, and 23 may be chosen to represent the key (five bits of red, six bits of green, five bits of blue). The bits used are usually chosen to make it easy for the software to manipulate the key and the subpicture data. The hardware logic in the display pipe must be designed to handle whatever bits are chosen for the key.

Figure 7:
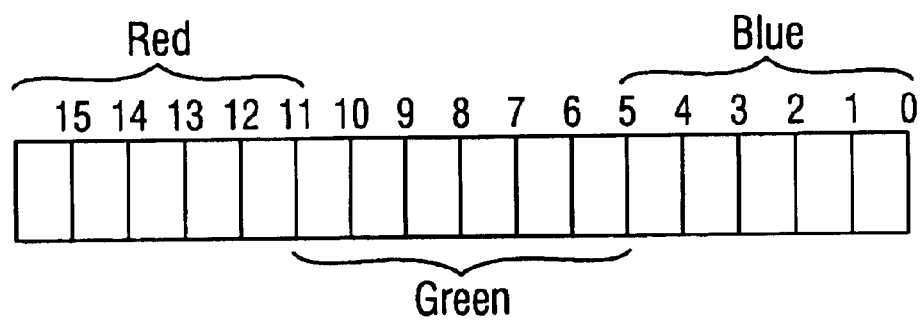
FIG. 7 is a diagram illustrating a 16-bit chunk of data in 16-bit RGB 565 mode.

For a 16-bit 565 video surface, an 8-bit key is used. FIG. 7 is a diagram illustrating a 16-bit chunk of data in 16-bit RGB 565 mode. As FIG. 7 shows, in 16-bit 565 RGB mode, video data has a 5-6-5 format (5 bits for red, 6 bits for green, 5 bits for blue). The subpicture data is still in the standard 4-4 format (4 bits for the alpha and 4 bots for the index). Thus the remaining 8 bits in the stream are open when subpicture data is sent. These 8 bits are used for the key.

One 8-bit combination must be set aside to indicate whether the data is subpicture information. This results in 256 possible colors being lost for the video data. Which colors are lost are determined by which 8-bit combination is chosen for the key.

For a 16-bit 555 video surface, a 1-bit key is used. FIG. 8 is a diagram illustrating a 16-bit chunk of data in 16-bit 555 RGB mode. As FIG. 8 shows, in 16-bit 555 RGB mode, video data has a 1-5-5-5 format (1 empty bit, 5 bits for red, 5 bits for green, 5 bits for red). The subpicture data is still in the standard 4-4 format (4 bits for the alpha and 4 bots for the index). Thus the remaining 8 bits in the stream are open when subpicture data is sent. However, since there is one unused bit in the video data, this bit is used as the key. This allows a solution without the loss of any color information in the video data.

Figure 9:
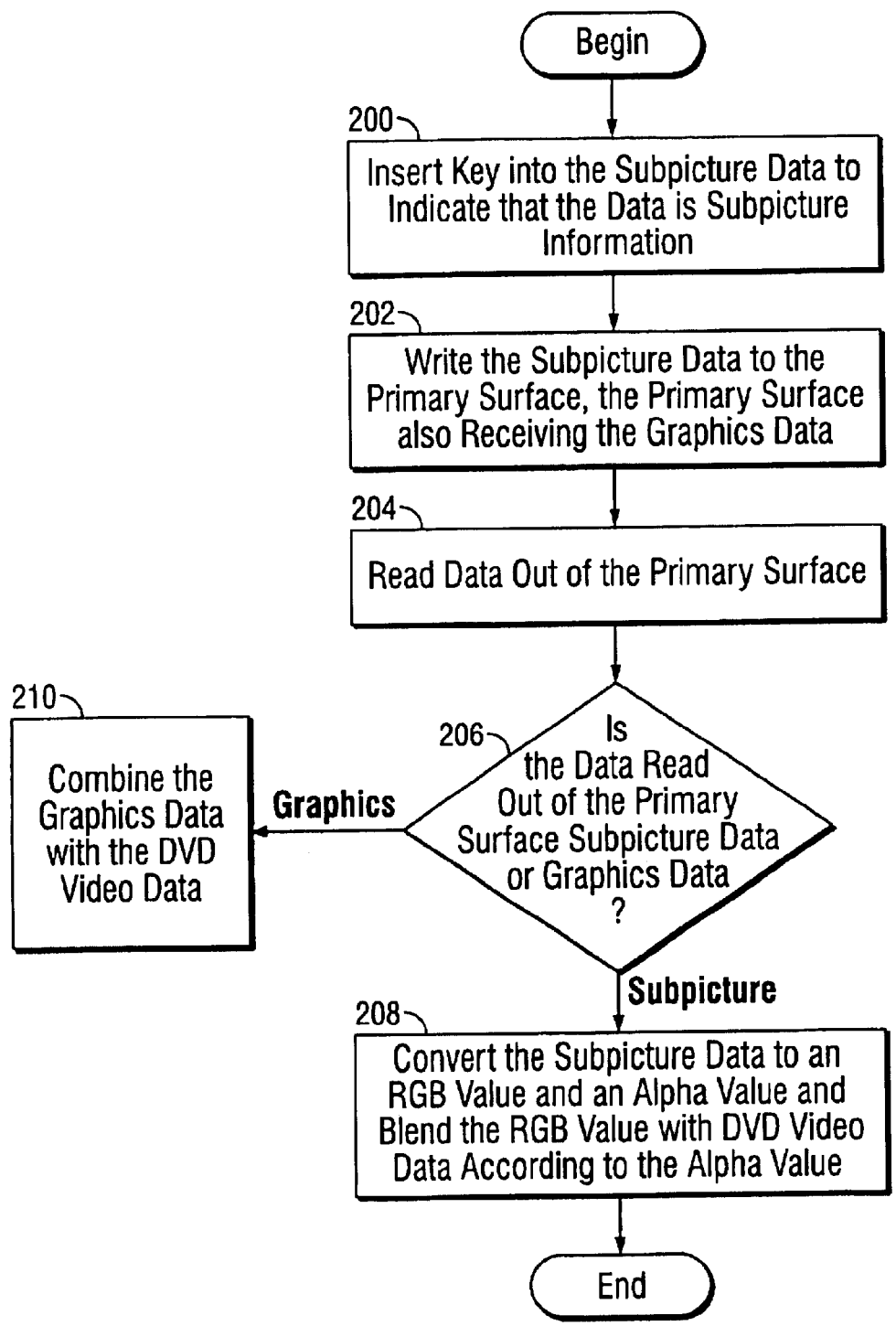
FIG. 9 is a flow diagram showing a method for rendering DVD subpicture data on a computer system having graphics information without a loss of subpicture resolution in accordance with a presently preferred embodiment of the present invention.

FIG. 9 is a flow diagram showing a method for rendering DVD subpicture data on a computer system having graphics information without a loss of subpicture resolution in accordance with a presently preferred embodiment of the present invention. At 200, a key is inserted into the subpicture data to indicate that the data is subpicture information. Then, at 202, the subpicture data is written to a primary surface, the primary surface also receiving the graphics data. At 204, the data is read out of the primary surface.

At 206, it is determined if the data read out of the primary surface is subpicture data or graphics data by looking for the key in the data. If the key exists, the data is subpicture data, and the method moves to 208, where the subpicture data is converted to an RGB value and an alpha value and the RGB value is blended with DVD video data according to the alpha value. If the data is graphics data, at 210 it is combined with DVD video data. This may require use of a color key if there is no alpha provided.

Figure 10:
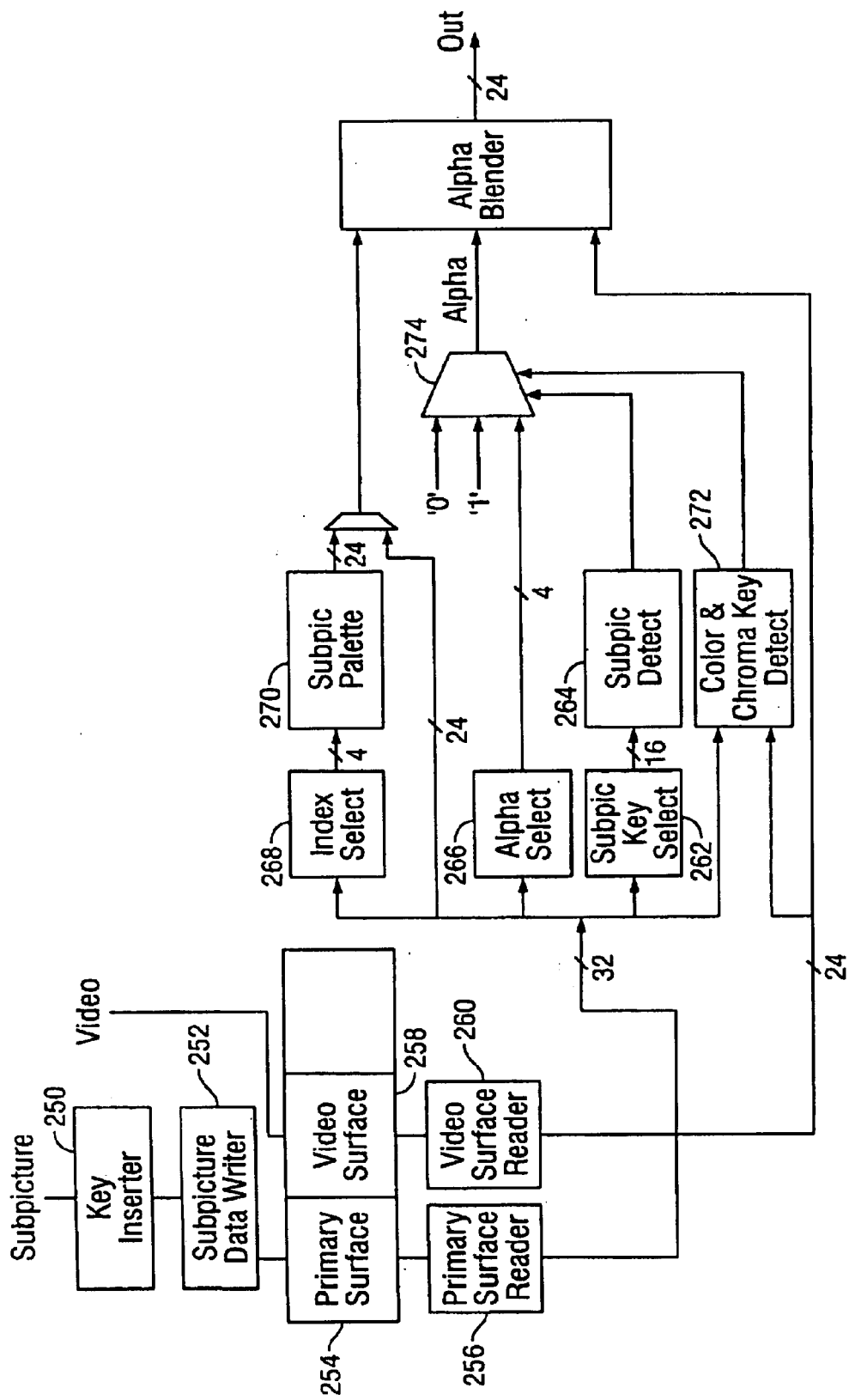
FIG. 10 is a block diagram illustrating a DVD subpicture data renderer in accordance with a presently preferred embodiment of the present invention.

FIG. 10 is a block diagram illustrating a DVD subpicture data renderer in accordance with a presently preferred embodiment of the present invention. Since portions of the renderer may be implemented in hardware and portions in software, the different blocks and components will be discussed and pictured abstractly.

A key inserter 250 takes subpicture data and inserts a key to indicate that the data is subpicture information. Then, a subpicture data writer 252 writes the subpicture data to a primary surface 254. A primary surface reader 256 reads the data out of the primary surface. Video data is stored in the video surface 258 and read out by video surface reader 260.

The hardware components (the graphics chip in a presently preferred embodiment of the present invention) must be designed to correctly interpret the key (if any). Thus, A subpicture key select block 262 is preprogrammed to select specific bits that are used to hold the key, the key indicating whether the data is subpicture or graphics information. A subpicture detect block 264, which may be simply a comparator, looks for a match to the subpicture key and indicating whether it is indeed a match. Alpha select block 266 selects the appropriate bits for the alpha, depending on the data format, while index select block 268 selects the appropriate bits for the index, again depending on the data format. Subpicture Palette 270 is a 16×24 bit look up table for translating the color information.

A color and chroma key detect block 272 is used if the data format is less than 32 bits, and thus there is no alpha field, because, as described earlier, it would be necessary to set aside a color to indicate pixels which are to be used to display video rather than graphics. Multiplexor 274 utilizes all this information and outputs an alpha value to the alpha blender 276, which then uses the alpha value to blend the graphics/subpicture information with the video information.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for rendering DVD subpicture data on a computer system having graphics data without a loss of subpicture resolution, said method comprising:
   inserting a key into the subpicture data to indicate that the data is subpicture information and not the graphics data;
   writing the subpicture data to a primary surface, the primary surface also receiving the graphics data;
   reading data out of the primary surface;
   determining if the data read out of the primary surface is subpicture data or graphics data by looking for the key in said data;
   converting the subpicture data to an RGB value and an alpha value and blending the RGB value with DVD video data according to the alpha value if the data is subpicture data; and
   combining the graphics data with the DVD video data if the data is graphics data.

2. The method in accordance with claim 1, wherein the primary surface is in 24-bit RGB mode.

3. The method in accordance with claim 2, wherein the subpicture data has 8 bits.

4. The method in accordance with claim 3, wherein said inserting comprises:
   inserting a 16-bit key into the subpicture data to indicate that the data is subpicture information and not the graphics data.

5. The method in accordance with claim 4, wherein the 16-bit key is inserted into bits spread evenly among said 24 bits.

6. The method in accordance with claim 2, wherein said determining comprises
   examining 16 bits of the data and comparing the 16 bits with a 16-bit combination reserved to indicate subpicture data.

7. The method in accordance with claim 1, wherein the primary surface is in 16-bit 565 RGB mode.

8. The method in accordance with claim 7, wherein the subpicture data has 8 bits.

9. The method in accordance with claim 8, wherein said inserting comprises:
   inserting an 8-bit key into the subpicture data to indicate that the data is subpicture information and not the graphics data.

10. The method in accordance with claim 9, wherein the 8-bit key is inserted into bits spread evenly among the 16 bits.

11. The method in accordance with claim 9, wherein said determining comprises:
    examining 8 bits of the data and comparing the 8 bits with an 8-bit combination reserved to indicate subpicture data.

12. The method in accordance with claim 1, wherein the primary surface is in 16-bit 555 RGB mode, wherein the 16-bit 555 RGB mode provides 5 bits for red information, 5 bits for green information, 5 bits for blue information, and 1 empty bit.

13. The method in accordance with claim 12, wherein the subpicture data has 8 bits.

14. The method in accordance with claim 13, wherein said inserting comprises:
    inserting a 1-bit key into the empty bit of the subpicture data to indicate that the data is subpicture information and not the graphics data.

15. The method in accordance with claim 12, wherein said determining comprises:
    examining 1 bit of the data and comparing the 1 bit with a 1-bit combination reserved to indicate subpicture data.

16. The method in accordance with claim 1, wherein said combining comprises:
    creating an alpha value based on whether the graphics data represents a color set aside as a key color and combining the graphics data and the DVD video data according to the alpha value.

17. A DVD subpicture data renderer comprising:
    a memory having a primary surface and a video surface;
    a key inserter;
    a subpicture data writer coupled to said key inserter and coupled to said primary surface;
    a primary surface reader coupled to said primary surface;
    a subpicture key select block coupled to said primary surface reader;
    a subpicture detector coupled to said subpicture key select block;
    an index select block coupled to said primary surface reader;
    a subpicture palette coupled to said index select block;
    an alpha select block coupled to said primary surface reader;
    a multiplexor having a plurality of inputs and an output, one of said inputs coupled to said alpha select block and another of said inputs coupled to said subpicture detector;
    a video surface reader coupled to said video surface; and
    an alpha blender coupled to said subpicture palette, said multiplexor, and said video surface reader.

18. The DVD subpicture data renderer in accordance with claim 17, further comprising:
    a color and chroma key detect block coupled to said primary surface reader, said video surface reader, and said alpha blender.

19. The DVD subpicture data renderer in accordance with claim 17, wherein said primary surface reader is contained in a graphics engine on a graphics chip.

20. The DVD subpicture data renderer in accordance with claim 17, wherein said video surface reader is contained in a video engine on a graphics chip.

21. A program storage device readable by a machine, tangibly embodying a program of instructions executable by the machine to perform a method for rendering DVD subpicture data on a computer system having graphics data without a loss of subpicture resolution, said method comprising:
    inserting a key into the subpicture data to indicate that the data is subpicture information and not the graphics data;
    writing the subpicture data to a primary surface, the primary surface also receiving the graphics data;
    reading data out of the primary surface;
    determining if the data read out of the primary surface is subpicture data or graphics data by looking for the key in said data;
    converting the subpicture data to an RGB value and an alpha value and blending the RGB value with DVD video data according to the alpha value if the data is subpicture data; and combining the graphics data with said DVD video data if the data is graphics data.

22. An apparatus for rendering DVD subpicture data on a computer system having graphics data without a loss of subpicture resolution, said apparatus comprising:

means for inserting a key into the subpicture data to indicate that the data is subpicture information and not the graphics data;

means for writing the subpicture data to a primary surface, the primary surface also receiving the graphics data;

means for reading data out of the primary surface;

means for determining if the data read out of the primary surface is subpicture data or graphics data by looking for the key in said data;

means for converting the subpicture data to an RGB value and an alpha value and blending the RGB value with DVD video data according to the alpha value if the data is subpicture data; and means for combining the graphics data with the DVD video data if the data is graphics data.

23. The apparatus in accordance with claim 22, wherein the primary surface is in 24-bit RGB mode.

24. The apparatus in accordance with claim 23, wherein the subpicture data has 8 bits.

25. The apparatus in accordance with claim 24, wherein said means for inserting comprises:

means for inserting a 16-bit key into the subpicture data to indicate that the data is subpicture information and not the graphics data.

26. The apparatus in accordance with claim 25, wherein the 16-bit key is inserted into bits spread evenly among said 24 bits.

27. The apparatus in accordance with claim 23, wherein said means for determining comprises:

means for examining 16 bits of the data and comparing the 16 bits with a 16-bit combination reserved to indicate subpicture data.

28. The apparatus in accordance with claim 22, wherein the primary surface is in 16-bit 565 RGB mode.

29. The apparatus in accordance with claim 28, wherein the subpicture data has 8 bits.

30. The apparatus in accordance with claim 29, wherein said means for inserting comprises:

means for inserting an 8-bit key into the subpicture data to indicate that the data is subpicture information and not the graphics data.

31. The apparatus in accordance with claim 30, wherein the 8-bit key is inserted into bits spread evenly among the 16 bits.

32. The apparatus in accordance with claim 30, wherein said means for determining comprises:

means for determining 8 bits of the data and comparing the 8 bits with an 8-bit combination reserved to indicate subpicture data.

33. The apparatus in accordance with claim 22, wherein the primary surface is in 16-bit 555 RGB mode, wherein the 16-bit 555 RGB mode provides 5 bits for red information, 5 bits for green information, 5 bits for blue information, and 1 empty bit.

34. The apparatus in accordance with claim 33, wherein the subpicture data has 8 bits.

35. The apparatus in accordance with claim 34, wherein said means for inserting comprises:

means for inserting a 1-bit key into the empty bit of the subpicture data to indicate that the data is subpicture information and not the graphics data.

36. The apparatus in accordance with claim 33, wherein said means for determining comprises:

means for examining 1 bit of the data and comparing the 1 bit with a 1-bit combination reserved to indicate subpicture data.

37. The apparatus in accordance with claim 22, wherein said means for combining comprises:

means for creating an alpha value based on whether the graphics data represents a color set aside as a key color and combining the graphics data and the DVD video data according to the alpha value.

* * * * *